(12) United States Patent
Anderson et al.

(10) Patent No.: US 6,517,598 B2
(45) Date of Patent: Feb. 11, 2003

(54) FILTER ELEMENT HAVING FLANGE AND METHODS

(75) Inventors: Ross Norman Anderson, Chanhassen, MN (US); Wayne R. W. Bishop, St. Louis Park, MN (US); Steven Scott Gieseke, Richfield, MN (US)

(73) Assignee: Donaldson Company, Inc., Minneapolis, IL (US)

( * ) Notice: Subject to any disclaimer, the term of this patent is extended or adjusted under 35 U.S.C. 154(b) by 0 days.

(21) Appl. No.: 09/875,325

(22) Filed: Jun. 6, 2001

(65) Prior Publication Data

US 2002/0185008 A1 Dec. 12, 2002

(51) Int. Cl.$^7$ .............................................. B01D 46/00
(52) U.S. Cl. ............................ 55/498; 55/500; 55/502; 55/509; 55/511; 55/521
(58) Field of Search .......................... 55/497, 498, 500, 55/502, 509, 511, 521, 385.1; 95/286, 287

(56) References Cited

U.S. PATENT DOCUMENTS

| | | |
|---|---|---|
| 1,238,068 A | 8/1917 | Slater et al. |
| 2,502,545 A | 4/1950 | Wellborn |
| 2,599,604 A | 6/1952 | Bauer et al. |
| 3,025,963 A | 3/1962 | Bauer |
| 3,076,554 A | 2/1963 | Bub |
| 3,209,917 A | 10/1965 | Yelinek |
| 3,676,242 A | 7/1972 | Prentice |
| 4,065,341 A | 12/1977 | Cub |
| 4,925,561 A | 5/1990 | Ishii et al. |
| 4,997,466 A | 3/1991 | Hood |
| 5,137,696 A | 8/1992 | Hitachi et al. |
| 5,211,846 A | 5/1993 | Kott et al. |
| 5,229,078 A | 7/1993 | Haerle |
| 5,266,195 A | 11/1993 | Hopkins |
| 5,304,312 A | 4/1994 | Forster et al. |
| 5,346,675 A | 9/1994 | Usui et al. |
| 5,350,515 A | 9/1994 | Stark et al. |

(List continued on next page.)

FOREIGN PATENT DOCUMENTS

| | | |
|---|---|---|
| DE | 37 15213 A1 | 11/1988 |
| DE | 44 29 527 A1 | 10/1995 |
| EP | 0 581 695 A1 | 2/1994 |
| GB | 703823 | 2/1954 |
| GB | 2 310 812 | 9/1997 |
| JP | 1171615 | 7/1989 |
| WO | WO 97/40908 | 11/1997 |
| WO | WO 97/40910 | 11/1997 |
| WO | WO 97/40917 | 11/1997 |
| WO | WO 97/41939 | 11/1997 |

Primary Examiner—David A. Simmons
Assistant Examiner—Minh-Chau T. Pham
(74) Attorney, Agent, or Firm—Merchant & Gould, P.C.

(57) ABSTRACT

A filter element is provided including a media construction including a corrugated sheet secured to a flat sheet rolled into a coiled construction. The filter element includes a mounting flange secured to the coiled construction. The mounting flange projects radially from the outer, annular surface of the coiled construction. The mounting flange defines at least one fastener socket to allow for axial mounting of the filter element into a housing. An air cleaner includes a housing with filter elements, as described herein, operably installed within. Preferably, the filter element is sealed within suitable housings with a seal, such as a radially directed seal. Preferably, the filter element is secured to the housing by axial mounting of the mounting flange to the housing using fasteners. Methods for installing, assembling, using, and servicing are provided herein.

19 Claims, 6 Drawing Sheets

U.S. PATENT DOCUMENTS

| | | |
|---|---|---|
| 5,374,402 A | 12/1994 | Hitachi et al. |
| 5,415,677 A | 5/1995 | Ager et al. |
| 5,435,870 A | 7/1995 | Takagaki et al. |
| 5,472,463 A | 12/1995 | Herman et al. |
| 5,484,466 A | 1/1996 | Brown et al. |
| 5,487,767 A | 1/1996 | Brown |
| 5,543,007 A | 8/1996 | Takagaki et al. |
| 5,547,480 A | 8/1996 | Coulonvaux |
| 5,613,992 A | 3/1997 | Engel |
| 5,645,718 A | 7/1997 | Hardison et al. |
| 5,714,126 A | 2/1998 | Frund |
| 5,755,843 A | 5/1998 | Sundquist |
| 5,762,671 A | 6/1998 | Farrow et al. |
| 5,772,883 A | 6/1998 | Rothman et al. |
| D396,098 S | 7/1998 | Gillingham et al. |
| 5,792,247 A | 8/1998 | Gillingham et al. |
| 5,820,646 A | 10/1998 | Gillingham et al. |
| 5,855,634 A * | 1/1999 | Berfeld .................. 55/498 |
| 5,895,574 A | 4/1999 | Friedmann et al. |
| 5,897,676 A | 4/1999 | Engel et al. |
| 5,931,979 A | 8/1999 | Immel |
| 6,190,432 B1 | 2/2001 | Gieseke et al. |
| 6,210,469 B1 | 4/2001 | Tokar |
| 6,221,122 B1 * | 4/2001 | Gieseke et al. ............ 55/502 |
| 6,235,195 B1 | 5/2001 | Tokar |
| 6,348,085 B1 * | 2/2002 | Tokar et al. ............... 55/502 |

* cited by examiner

FILTER ELEMENT HAVING FLANGE AND METHODS

TECHNICAL FIELD

This disclosure describes filter constructions for filtering fluids, such as gas or liquid. In particular, this disclosure describes a straight-through flow filter element with an inlet grid, and methods for using and assembling such a filter element.

BACKGROUND OF THE INVENTION

Straight through flow filter elements have been used in systems for cleaning fluid passing therethrough. Straight through flow filter elements typically have an inlet face and an oppositely disposed outlet face. In this manner, fluid flows in one direction upon entering the filter element at the inlet face and will have the same direction of flow as it exits the outlet face. Typically, straight through flow filter elements will be installed in a duct or housing of some type. After a period of use, the filter element will require servicing, either cleaning or a complete replacement of the filter element.

Improvements to straight through flow filter elements are desirable.

SUMMARY

A filter element is provided having a media construction comprising a corrugated sheet secured to a flat sheet rolled into a coiled construction. The coiled construction defines a plurality of flutes, a first end, an opposite second end, and an outer annular surface. The plurality of flutes comprises inlet flutes and outlet flutes. The inlet flutes are open at portions adjacent to the first end and closed at portions adjacent to the second end; and the outlet flutes are closed at portions adjacent to the first end and open at portions adjacent to the second end. The filter element includes a mounting flange secured to the coiled construction. The mounting flange projects radially from the outer, annular surface of the coiled construction. The mounting flange defines a fastener arrangement to allow for axial mounting of the filter element into a housing.

An air cleaner includes a housing with a filter element, as described herein, operably installed within. Preferably, the filter element is sealed within suitable housings with a seal, such as a radially directed seal. Preferably, the filter element is secured to the housing by axial mounting of the mounting flange to the housing, using fasteners.

Methods for installing, assembling, using, and servicing are provided herein.

DETAILED DESCRIPTION OF THE PREFERRED EMBODIMENT

Figure 1:
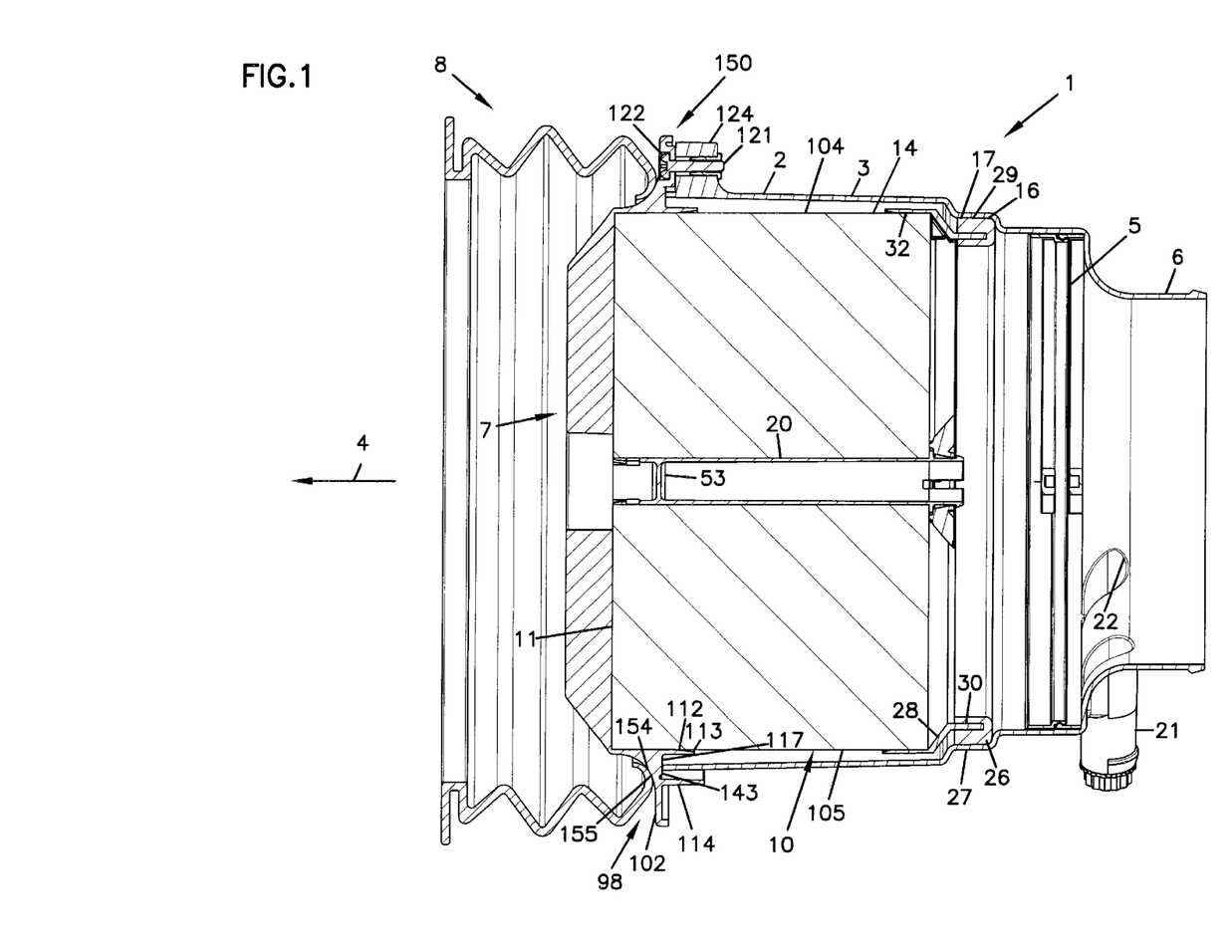
FIG. 1 is a schematic, cross-sectional view of one embodiment of an air cleaner including a housing with a filter element, constructed according to principles of this disclosure, depicted in an environment of use with an inlet bellows.
Figure 2:
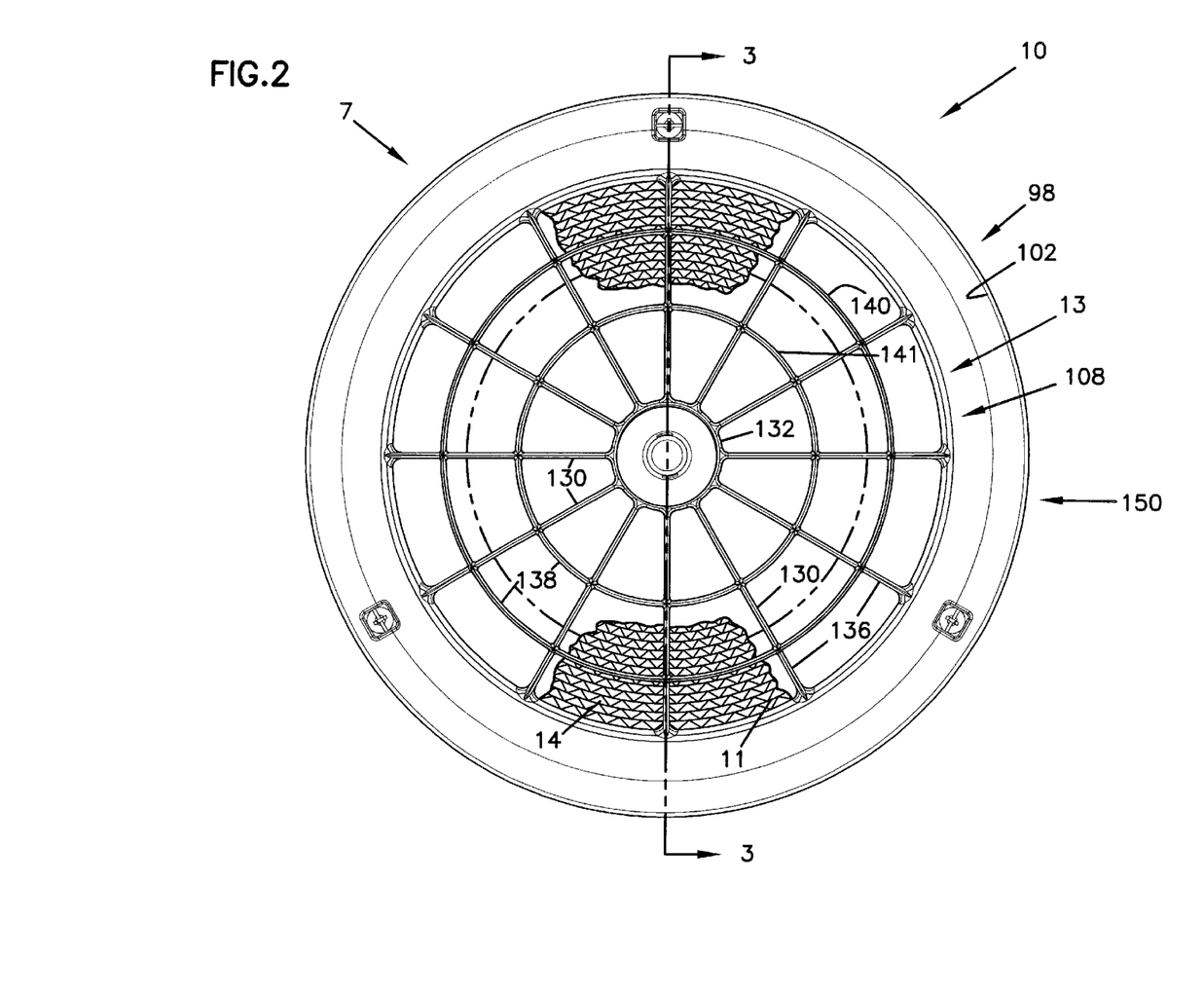
FIG. 2 is a schematic end view of one embodiment of a filter element usable in the air cleaner depicted in FIG. 1.
Figure 3:
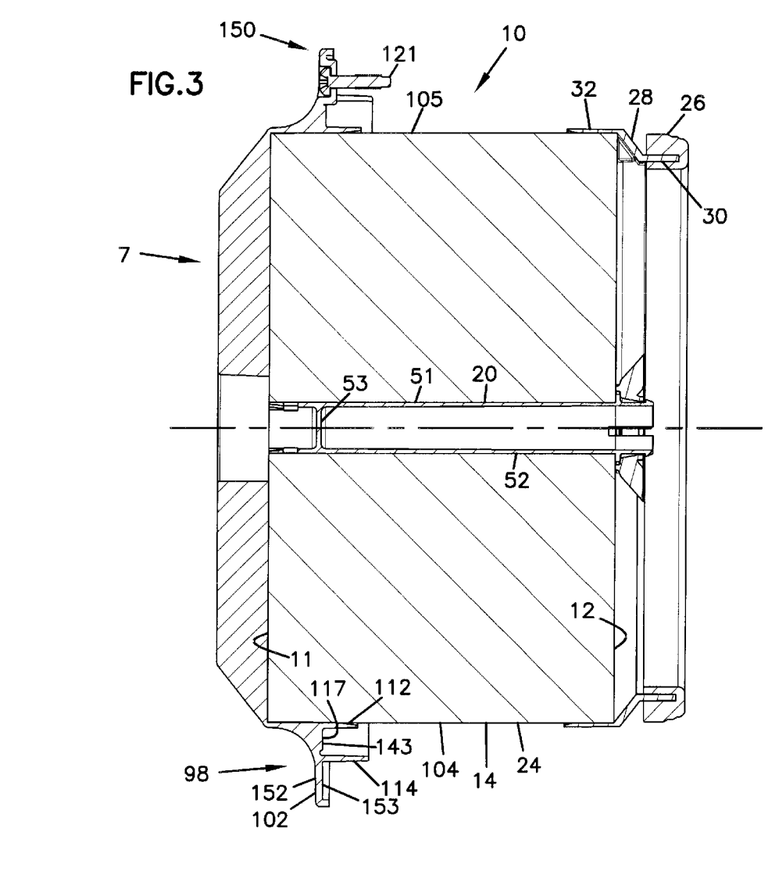
FIG. 3 is a schematic, cross-sectional view of the filter element depicted in FIG. 2, the cross-section being taken along the line 3—3 of FIG. 2.

FIG. 1 depicts an air cleaner 1, including a housing 2 with a filter element 10 operably mounted therein. The housing 2 preferably includes a body member 3. The filter element 10 is selectively removable and replaceable from the housing 2 by pulling the element 10 from the body member 3 in the direction of arrow 4.

The air cleaner 1 is usable for cleaning fluid, such as gas, in particular air. The filter element 10 is configured to permit straight through flow. By the term "straight through flow," it is meant that the fluid flows directly through the filter element 10, entering at an inlet face 11 and exiting at an opposite, outlet face 12, without turning a corner, and the inlet face 11 and outlet face 12 are generally in parallel planes. The filter element 10 includes filter media 14 that is configured to filter particulates from the gas stream entering at the inlet face 11, such that the gas stream exiting the outlet face 12 is at least partially clean (i.e., free of particulates). As can also be seen in FIG. 1, the filter element 10 includes a seal member 16, which aids in inhibiting leakage between the filter element 10 and the housing 2 in which the filter element 10 is installed. The filter element 10 shown also includes include an optional center piece construction 20, depicted in FIG. 4.

The air cleaner 1 depicted also includes an optional secondary element 5. Usable secondary elements include the secondary elements described in U.S. Pat. No. 6,221,122 issued on Apr. 24, 2001, which patent is incorporated herein by reference. In FIG. 1, the secondary element 5 is depicted schematically, and is oriented downstream of the filter element 10. The secondary element 5 helps to protect downstream components in the filtration system, in case of failure of the filter element 10. The secondary element 5 also protects downstream components during servicing of the air cleaner 1. By "servicing", it is meant when the filter element 10 is removed from the body member 3 and replaced with a new filter element.

Other features visible in FIG. 1 include an outlet tube 6 on the body member 3 and an inlet grid 7 construction having a screen 13. In general, the inlet grid construction 7 helps to protect the filter element 10. The screen 13 can help to remove large particles, such as leaves and insects from the gas stream being directed into the filter element 10. Preferred constructions and descriptions of other features for the inlet grid construction 7 are discussed further below. A bellows 8 is also depicted and, when used with the air cleaner 1, helps to direct a gas stream into the inlet face 11 and, ultimately, through the media 14. Also, in the one depicted, leading from the outlet tube 6 is a tap 21 for a compressor port, and well as a tap 22 for a restriction indicator.

In general, the filter media 14 depicted is a coiled construction 24 having a fluted sheet secured to a flat sheet. Filter media 14 usable in this construction is described in detail in U.S. Pat. No. 6,190,432 and international publication WO 97/40918, published Nov. 6, 1997. Each of these publications is incorporated by reference herein. The fluted sheet generally is a corrugated layer and is secured to the flat sheet with an adhesive, which helps to form appropriate seals. The corrugation utilized in the filter media 14 can be many types of configurations. Of those possible, examples include corrugations resulting in straight flutes, where the flutes are parallel to each other; straight flutes having crushed ends or pinched ends; and tapered flutes, where alternating flutes gradually converge from a wide section to a narrow section with the next adjacent flute diverging from a narrow section to a wide section. In the element 10 depicted, the corrugated sheet and flat sheet secured together are rolled or coiled around a portion of the center piece construction 20, with an adhesive to inhibit air leakage between the media 14 and the center piece construction 20. In other embodiments, the element 10 may be coreless, such that the corrugated sheet and flat sheet secured together are not rolled around a center core.

The media 14 includes flute chambers form alternating peaks and troughs. The troughs and peaks divide the flutes into a first row and a second row. The flute chambers are then closed by a bead of sealant that fills a portion of the upstream end of the flute between the fluting sheet and the flat sheet. On the opposite end, another end bead closes the downstream end of alternating flutes. This results in filter media 14 having media comprising a plurality of flute chambers, with each of the flute chambers having a first end adjacent to the filter element inlet face 11, and a second end adjacent to the filter element outlet face 12. Selected ones of the flute chambers are open at the first end and closed at the second end ("inlet flutes"), while selected ones of the flute chambers are closed at the first end and open at the second end ("outlet flutes").

When using filter media 14 constructed in this manner, during use, unfiltered fluid, such as air, enters the inlet flutes at the inlet face 11 through the open upstream end. The unfiltered fluid is not permitted to pass through the downstream ends of those flute chambers that they entered into because those particular flute chambers are closed. Thus, the fluid is forced to proceed through the fluting sheet or the flat sheet. As the unfiltered fluid passes through the fluting sheet or the flat sheet, the fluid is cleaned or filtered. The fluid then passes through the outlet flutes that have their upstream ends closed and their downstream ends open.

Figure 6:
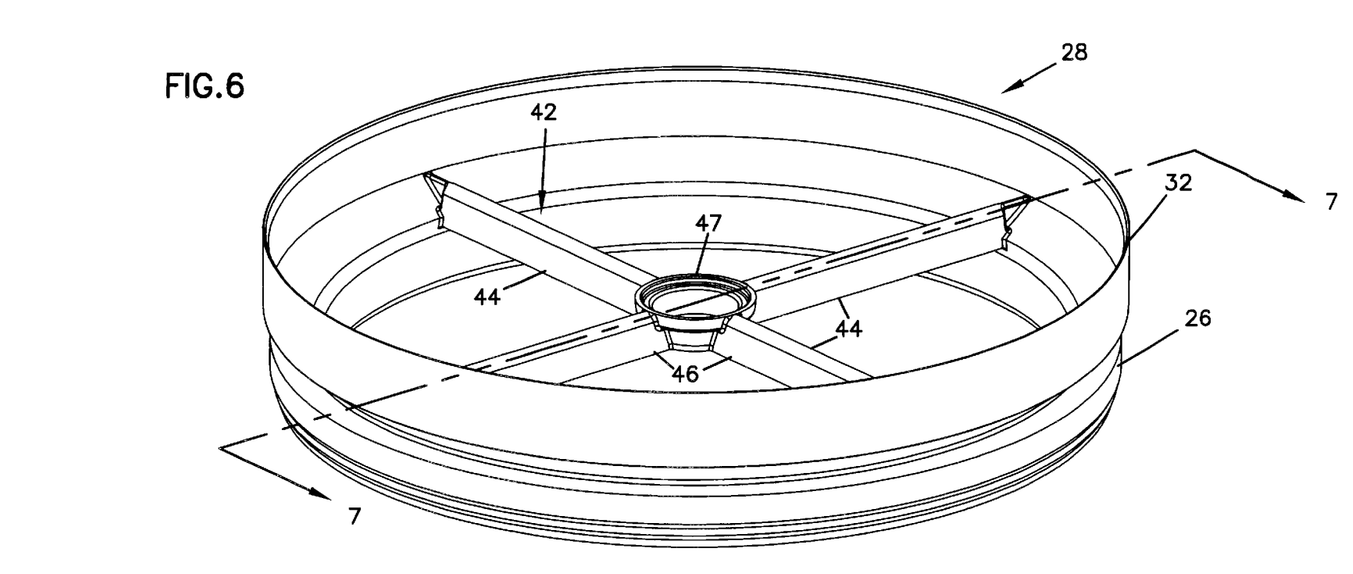
FIG. 6 is a schematic, perspective view of an embodiment of the. framework utilized in the filter element depicted in FIG. 3.
Figure 7:
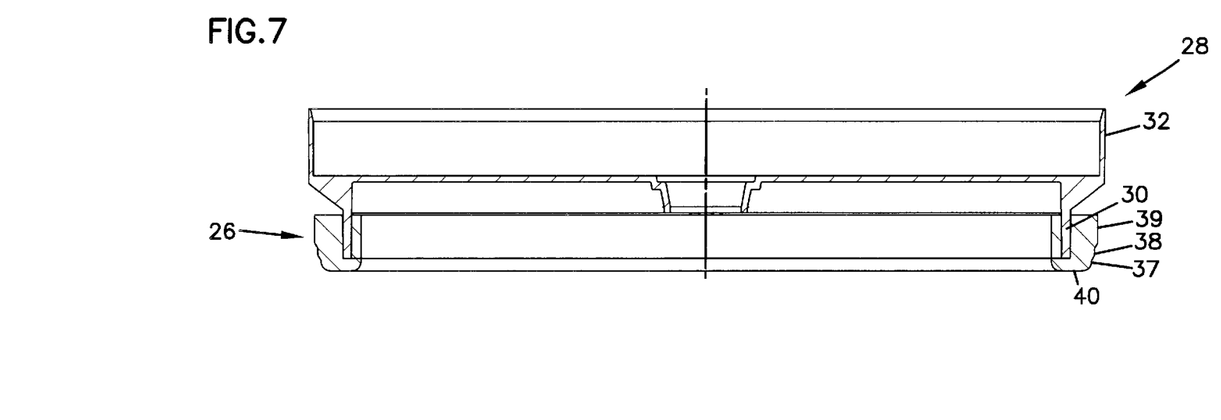
FIG. 7 is a schematic, cross-sectional view of the framework depicted in FIG. 6, the cross-section being taken along the line 7—7 of FIG. 6.

In reference again to FIG. 1, it can be seen how the filter element 10 is sealed within the housing 2. The seal member 16 is for creating a seal 17 with the housing that the filter element 10 is installed within. Such seal 17 will inhibit leakage of fluid between the filter element 10 and the housing, to ensure that the unfiltered fluid must pass through the filter media 14 for cleaning. The seal member 16 can include various types of sealing arrangements, such as axially directed seals, radially directed seals, or a combination of these. In the particular preferred seal member 16 depicted in FIG. 1, the seal member 16 is a radial seal member 26, configured to result in a radially directed seal 27 with the housing. In this particular embodiment, the radial seal member 26 is supported by a frame construction or seal ring 28 (FIGS. 6 and 7). The frame construction 28 includes an extension 30 that projects or extends axially from the outlet face 12. The seal ring 28 also includes a skirt or band 32 that is used to secure the filter media 14 to remaining portions of the seal ring 28.

The particular radial seal member 26 that is preferred is shown, in cross-section in FIG. 7. The preferred seal member 26 depicted has a stepped cross-sectional configuration of increasing outermost dimensions and defines a plurality of progressively larger steps, in this case, three steps 37, 38, 39 from an end tip 40 and in the direction toward the rest of the filter element 10. The smallest step 37 allows for easy insertion of the filter element 10 into the housing. The largest step 39 ensures that a tight radial seal 27 is formed. In preferred cases, the radial seal member 26 is made from a polyurethane foam material having an "as-molded" density of less than 25 lbs. per cubic foot, and typically about 11–22 lbs. per cubic foot. This material permits the seal member 26 to be soft and compressible, such that the seal member 26 can be compressed between the extension 30 and a sealing surface 29 of the housing 2 in which it is installed. In preferred applications, the seal member 26 is compressed between about 15% and 40% of its thickness. The radial seal member 26 and the manner in which it is used to seal against a housing is described in detail in U.S. Pat. No. 6,190,432, which is incorporated herein by reference.

Preferably, the radial seal member 26 will be supported by the seal ring 28 to help keep the seal member 26 properly oriented against the sealing surface 29 of the housing 2. The seal ring 28 preferably includes a truss system 42 (FIG. 6) to help support the seal member 26. In general, the truss system 42 includes a plurality of struts or support members 44 arranged and configured to provide structural support and take the forces exerted by the compression of the seal member 26 against the extension 30. The struts or support members 44 can be arranged in a variety of configurations. In the particular arrangement shown in FIG. 7, the truss system 42 includes a plurality of braces 46 symmetrically arranged over the outlet face 12 in a cross-shape, radially extending from a hub 47 centered over the center piece construction 20 and terminating at the extension 30 and the band 32.

As mentioned above, the filter element 10 may include optional center piece construction 20. The particular embodiment of the filter element 10 depicted includes one embodiment of center piece construction 20. The center piece construction 20 provides a mounting structure for holding and having the filter media 14 mounted thereon. The center piece construction 20, in preferred embodiments, also provides structure that is constructed and arranged to connect or be secured to other portions in a fluid cleaning system. For example, the center piece construction 20 may be constructed to permit framework from the filter housing 2 to be secured thereto. It may also permit other structural support members from the filter element 10, the housing 2, or other portions of the filtration system to connect thereto. Alternatively, the center piece construction 20 may merely function to hold the filter media 14 and be devoid of any other connections. In situations that the center piece construction 20 is devoid of connections, either at one or both ends, the center piece construction 20 may be blocked with a suitable plug at one or both ends.

In the particular embodiment illustrated, the center piece construction 20 is depicted as being releasably, selectively secured or attached to the seal ring 28.

Figure 4:
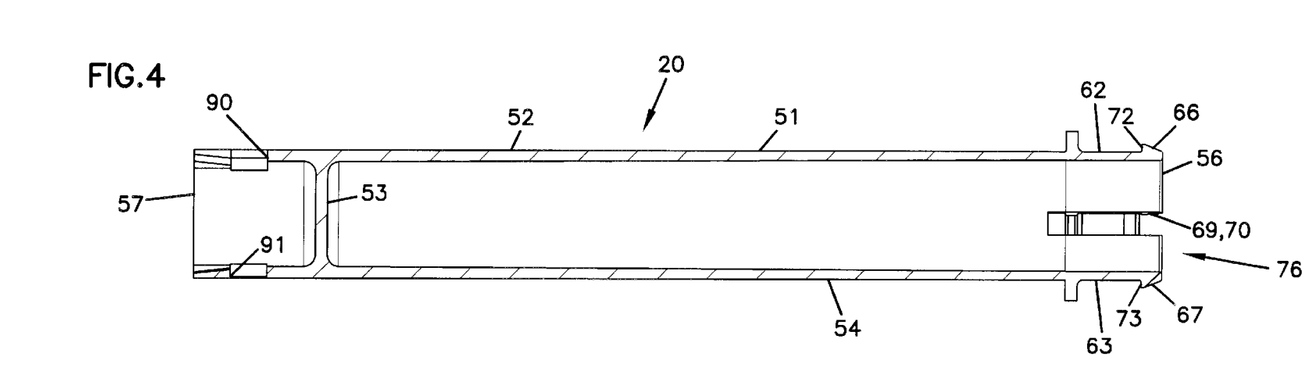
FIG. 4 is an enlarged, schematic, cross-sectional view of one embodiment of a central core utilized in the filter element of FIGS. 2 and 3.

FIG. 4 shows the center piece construction 20 in schematic, cross-sectional view. In this particular embodiment, the center piece construction 20 comprises a central core 51 to the filter element 10. The core 51 is embodied as tube 52, preferably, a hollow cylinder 54 with a wall 53 plugging the cylinder 54. The cylinder 54 includes the first and second opposite ends 56, 57. The first end 56 is configured for selective attachment to framework, in this case, the seal ring 28, usually located at the outlet face 12. The second end 57 is configured for optional attachment to some other structure, external of the coiled construction 24, such as an optional handle (not shown), and is usually located at the inlet face 11. In other arrangements, the second end 57 may be optionally attached to the inlet grid 8, explained below.

Figure 5:
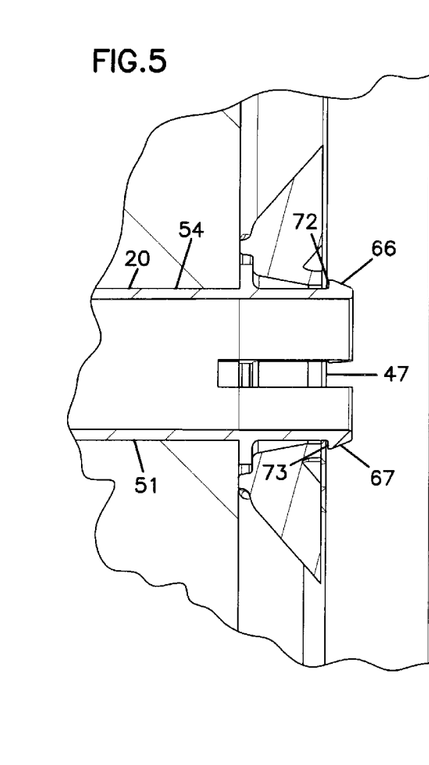
FIG. 5 is a schematic, enlarged, fragmented, cross-sectional view of FIG. 3 showing a connection between framework on the element of FIG. 3 and the central core of FIG. 4.

As mentioned above, the first end 56 of the cylinder 54, in the one depicted, is constructed and arranged to connect to framework, such as the seal ring 28. Preferably, the first end 56 of the cylinder 54 includes a hook arrangement 76. The hook arrangement 76 includes at least one flange, preferably, a pair of deflectable flanges 62, 63 having barbs or hooks 66, 67 that engage the central hub 47 of the frame construction 28. In particular, the cylinder 54 has a pair of cut out extensions 69, 70 that allow the flanges 62, 63 to deflect toward each other (radially inwardly). Typically, the deflection will occur by camming force exerted by the hub 47 against the hooks 66, 67. See FIG. 5. As the seal ring 28 and the cylinder 54 are moved axially toward each other and the flanges 62, 63 are deflecting inwardly, eventually the hub 47 will reach reliefs 72, 73 on the hooks 66, 67. When this happens, the flanges 62, 63 will deflect back toward their unstressed position, and the cylinder 54 will be secured to the seal ring 28 because the hub 47 will be trapped below the hooks 66, 67. A rib 74, radially extending from the cylinder wall 75 and adjacent to the flanges 62, 63, prevents the frame 28 from sliding axially along the cylinder 75 toward the second end 57. It should be understood that the hook arrangement 76 could be on the framework 28 and engage the cylinder 54.

In reference now to FIG. 4, the second end 57 has features to permit it to be optionally secured to other structure (e.g., a handle or the inlet grid 8). In particular, the preferred cylinder 54, at the second end 57, defines at least one, and in this instance, a pair of apertures or voids 90, 91. The voids 90, 91 are configured to receive, for example, barbs or deflecting flanges to provide for a snap-fit engagement between the cylinder 54 and the desired structure. Again, it should be understood that parts can be reversed—that is, the second end 57 could have the barbs or deflecting flanges and engage apertures on the mating structure.

Note that in the cylinder 54 depicted, the voids 90, 91 are radially offset by 90 degrees relative to the cut out extensions 69, 70 of the first end 56. The voids 90, 91 are generally in line with the flanges 62, 63. This is arranged in this manner for molding techniques.

In general, in preferred embodiments, the filter element 10 includes a handle 98 to aid in insertion and removal of the filter element 10 from the housing 2. The handle 98 may be embodied in many different structures. One possible embodiment includes the handle 98 as a projecting knob, secured to the coiled construction 24. For example, the projecting knob may be secured to the end 57 of the central core 51. Another possible embodiment includes the handle 98 as being a projection 100 extending from the coiled construction 24, and extending a sufficient distance away from the coiled construction 24 to permit a user's hand or fingers to grasp the projection 100 and manipulate the filter element 10. In the illustrated embodiment of FIG. 1, the handle 98 is embodied as an extending flange 102 projecting radially from an outermost peripheral surface 104 of the coiled construction 24. In the one illustrated, the flange 102 extends at least one inch, typically 1.25–2 inches, from an outer annular surface 105 of the media 14. Further, in the particular preferred embodiment illustrated in FIG. 1, the flange 102 is an integral, unitary part of the inlet grid construction 7. Preferably, it is part of the same molded part as the inlet grid construction 7.

In general, the filter element 10 includes a mounting flange secured to the coiled construction 24 to allow for axial mounting of the filter element 10 into the housing 2. In the embodiment depicted, a mounting flange 150 is shown as projecting radially from the outer annular surface 105 of the coiled construction 24 and defines a fastener arrangement 77 including plurality of mounting holes or sockets 122 to receive suitable fasteners, such as bolts 121 therethrough. In the particular embodiment depicted, the mounting flange 150 is also the extending flange 102, operating as handle 98. In the illustrated embodiment, there are three sockets 122, symmetrically arranged in the mounting flange 150. The bolts 121 are received in an axial direction relative to the filter element 10 in threaded fastener housings 124 provided in the body member 3. This helps to releasably secure the filter element 10 within the housing 2.

Figure 8:
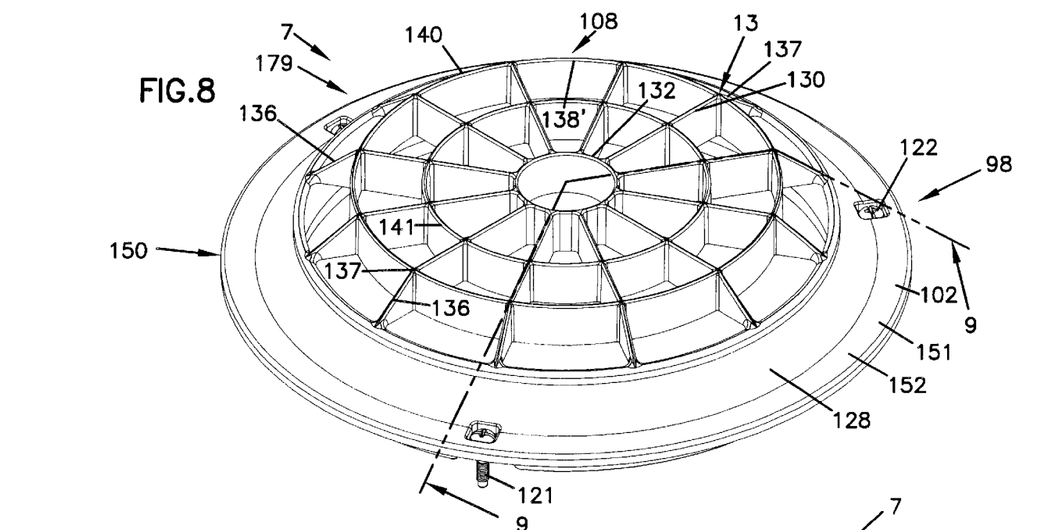
FIG. 8 is a schematic, perspective view of one embodiment of an inlet grid utilized with the filter element of FIG. 3.
Figure 9:
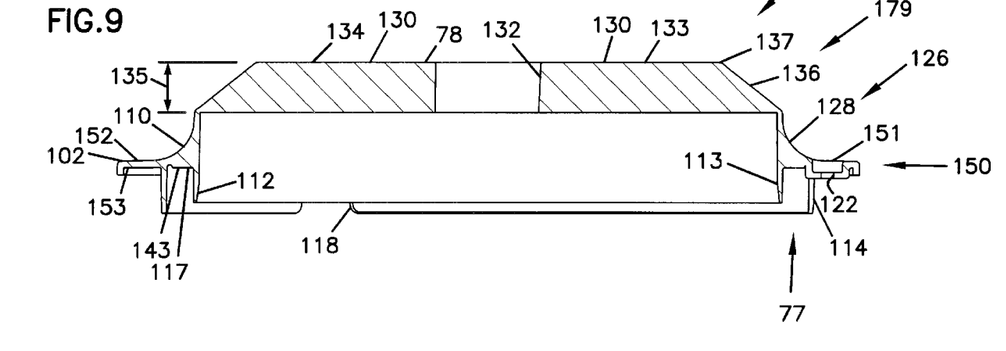
FIG. 9 is a schematic, cross-sectional view of the inlet grid depicted in FIG. 8 but without the fasteners in FIG. 8, the cross-section being taken along the line 9—9 of FIG. 8.

In preferred embodiments, in FIGS. 8 and 9, the mounting flange 150 includes an extending member 151 having first and second, opposite axial surfaces 152, 153. The first axial surface 152 is oriented facing away from the outlet face 12 of the filter element 10, while the second axial surface 153 is oriented facing toward the outlet face 12. The mounting flange 150, in particular the first axial surface 152 (FIGS. 8 and 9), helps to act as a sealing surface 110 for the bellows 8 (FIG. 1). As such, the sealing surface 110 is smooth and continuous and devoid of any ribs, bumps, or protrusions. In FIG. 1, note that the bellows 8 has an engagement end 154. The engagement end 154 rests against the first axial surface 152 to form a seal 155 therewith. The seal 155 helps to inhibit leakage of gas between the bellows 8 and the filter element 10. In preferred embodiments, the flange 102 is also shaped to provide a guiding surface for directing and placing the bellows 8 against the sealing surface 110. This is explained further below.

As mentioned above, the inlet grid construction 7 includes screen 13 that is preferably constructed of sturdy, durable, strong material such to protect the inlet end 11 of the element 10. For example, in some preferred embodiments, the screen 13 will include a grid pattern 108 that helps to evenly distribute forces exerted upon the screen 13. This may be useful for servicing of the truck which the air cleaner 1 is installed—for example, persons servicing the truck may step on the screen 13 to access other parts of the truck. The grid pattern 108 is arranged to distribute the weight of the person evenly and provide protection to the filter element 10. In addition, the screen 13 helps to prevent clogging of the inlet face 11 by filtering out or removing large particles and debris, such as leaves, butterflies, and other insects.

The flange 102 may be grasped, such that the filter element 10 may be axially inserted into the body member 3 and pushed until the radial seal 27 is formed against the sealing surface 29 of the housing 2. Analogously, when servicing the filter element 10, the flange 102 may be grasped to allow the filter element 10 to be pulled in an axial direction from the body member 3 to release the radial seal 27 and completely remove the filter element 10 from the housing 2.

In reference now to FIGS. 8 and 9, a particular, preferred embodiment of the inlet grid construction 7 is illustrated. Preferably, the inlet grid construction 7 includes a first, annular wall 112, forming an axial extension or band 113. The band 113 is used to secure the inlet grid construction 7 to the coiled construction 24. This can be viewed in FIG. 1. A suitable adhesive may be used to permanently secure the inlet grid construction 7 to the coiled construction 24. By "permanently secure", it is meant that the inlet grid construction 7 may not be removed from the coiled construction 24 without damaging either or both of the filter media 14 and the inlet grid construction 7. In some applications, the inlet grid construction 7 is not permanently secured to the coiled construction 24; rather, it is removably secured thereto for selective placement on and removal from the coiled construction 24. For example, it may be desired to re-use the inlet grid construction 7, while supplying a new coiled construction 24 when servicing the filter element 10. In such instances, the inlet grid construction 7 would be removed from the old coiled construction 24, and then would be secured to a new coiled construction 24.

In reference again to FIG. 9, radially spaced from the first wall 112 is an outer or second wall 114 that circumscribes the first wall 112. Adjacent to the second wall 114 and extending radially therefrom is the flange 102. When the filter element 10 is operably installed within the housing 2, a side wall 115 of the body member 3 will rest between the first and second walls 112, 114. As can be seen in FIG. 1, the second wall 114 circumscribes the side wall 115. This second wall 114 helps to provide a weather seal to inhibit particles from entering the air cleaner 1 at the interface 116 between the inlet grid construction 7 and the body member 3. The second wall 114 defines a plurality of voids 118 (FIG. 9). In the embodiment depicted, there are three voids 118, although only one is visible in FIG. 9. The voids 118 permit the outer wall 114 of the inlet grid construction 7 to fit over the fastener housings 124 of the housing 2. The voids 118 also provide a key for proper alignment of the filter element 10 within the housing 2 by causing the element 10 to be mounted with the sockets 122 in the mounting flange 150 to be aligned with the fastener housings 124 of the housing 2.

In preferred embodiments, the first wall 112 and the second wall 114 define a channel or housing engagement pocket 143 therebetween. In particular, extending between the first wall 112 and the second wall 114 is an engagement surface 117. The engagement surface 117 is generally perpendicular to each of the first wall 112 and second wall 114. The engagement surface 117 provides a stop or an abutment surface for the side wall 115 to engage when the filter element 10 is installed within the body member 3. Although not illustrated in this particular embodiment, in some embodiments, the engagement surface 117 may support an O-ring gasket to provide additional sealing with the housing 2.

Figure 10:
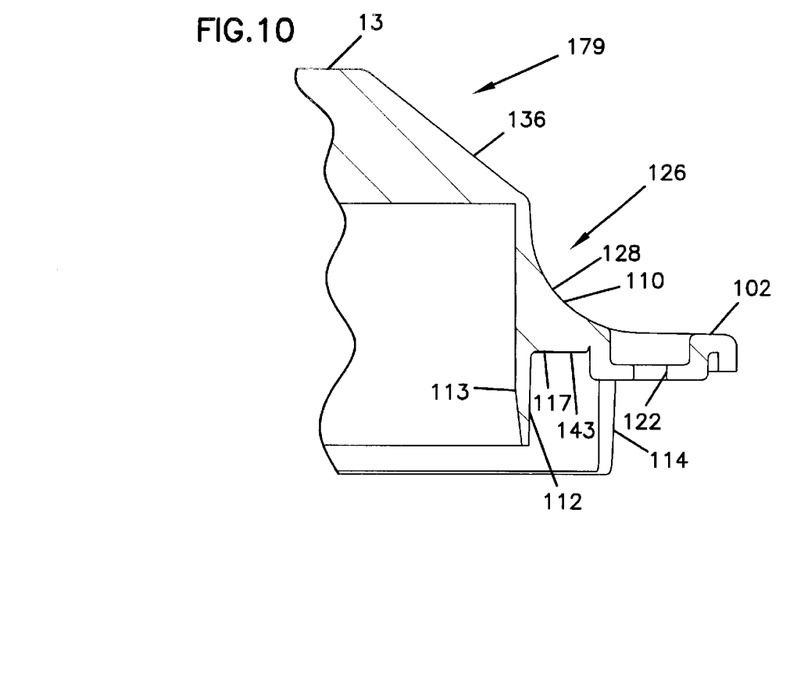
FIG. 10 is a schematic, enlarged, fragmented cross-sectional view of a portion of the inlet grid depicted in FIG. 9.

In reference to FIGS. 9 and 10, the preferred inlet grid construction 7 shown, includes a contoured surface 126 as part of the mounting flange 150 extending from the screen 13 to the first axial surface 152 of the flange 102. The contoured surface 126, preferably, forms a smooth, curve in the form of a concave surface or arc 128, extending concavely from the screen 13 to the first axial surface 152. One articular preferred arc 128 usable forms a radius of about 10–20 mm. The arc 128 serves to guide the orientation of the bellows 8 onto the flange 102.

In reference now to FIG. 8, the screen 13 is viewable in perspective view. The preferred screen 13 depicted includes a plurality of spokes 130 arranged leading from a central, circular hub 132 to the first wall 112. Preferably, there are at least six spokes 130, typically 8–16 spokes, and in the one shown, 12 spokes. Each of the spokes 130 has a height 135 sufficient to provide strength and rigidity in order to protect the filter element 10. The cross-section of two of the spokes 130 can be seen in FIG. 9 at 133, 134. In preferred embodiments, each of the spokes 130 has a height 135 at least 0.5 inch, typically 0.75–1 inch. Preferably, the spokes 130 are arranged symmetrically.

A ramp construction 179 is preferably part of the inlet grid construction 7 to help guide the bellows 8 into position. In particular, note that at each of the outermost radial ends 137 of the spokes 130, the ramp construction 179 is provided by a bevel or ramp 136. The ramp 136 extends from an outer surface 78 of each of the spokes 130 to the arc 128, being angled at least 10 degrees, typically 30–60 degrees from a plane having the outer surface 78 of the spokes 130. In cooperation with the arc 128, the ramp 136 also helps to guide the bellows 8 into position. The ramp 136 also provides for structural rigidity and strength of the inlet grid construction 7.

Referring again to the perspective view of the inlet grid construction 7 in FIG. 8, preferred embodiments for the screen 13 include a series of support braces 138 extending between and joining the spokes 130. The braces 138 are arranged to form first and second circles 140, 141 that circumscribe the central hub 132. Each of the braces 138 is generally arcuate.

In addition to the grid 108 helping to protect the element 10 and distribute weight applied to it, in combination with the flange 102, it provides ornamentation to the filter element 10 to provide for an attractive and eye-catching appearance. Additional views of the filter element 10 are provided in commonly assigned U.S. Patent application Ser. No. 29/143,032 entitled, "Filter Element Having Inlet Grid" filed on the same date as this application, now issued as U.S. Pat. No. D460,169 and which is incorporated by reference herein.

In use, air to be filtered is directed through the optional bellows 8, through the screen 13 of the inlet grid construction 7, through the inlet face 11 and through the filter media 14. The cleaned air then exits the filter element 10 through the outlet face 12, past the seal ring 28, through the optional secondary element 5, and then exits the air cleaner 1 through the outlet tube 6. From there, the air is directed to downstream components such as an engine for combustion purposes.

To initially install the filter element 10 in the housing 2, the body member 3 is provided. The filter element I is grasped by the user, preferably by the flange 102. The filter element 10 is inserted through an open end of the body member 3 and is pushed axially into the body member 3 until the engagement surface 117 on the flange 102 abuts the side wall 115. This should also be a sufficient distance to have properly oriented the radial seal member 26 against the sealing surface 29 to form the radial seal 27. The filter element 10 is then secured to the housing 2 by using the bolts 121 through the flange 102 to secure the filter element 10 to the housing 2.

After a period of operation, the filter element 10 will be loaded or occluded and require service. To service the air cleaner 1, the filter element 10 is removed from the housing 2. This is done by removing the bolts 121 from the flange 102. The flange is then grasped by the user, and the user pulls the filter element 10 by the flange 102 from the body member 3. This releases the radial seal 27. The used filter element 10 may then be refurbished or discarded. It is noted that, in preferred embodiments, the filter element 10 is at least 95% metal free, preferably 100% metal free. A new filter element 10 may then be installed in the housing 2.

To construct the filter element 10, the media 14 is wound around the central core 51 to provide the coiled construction 24. The first end 56 will be projecting from the coiled construction 24 and then snapped into the hub 47 of the seal ring 28. The seal ring 28 will be secured to the coiled construction 24 by a suitable adhesive. The inlet grid construction 7 will also be secured to the opposite end of the filter element 10. This is done by orienting the inlet grid construction 7 over the inlet end 11 of the filter element 10 and placing the band 113 around the coiled construction 24 and securing it thereto by a suitable adhesive.

The above specification, examples and data provide a complete description of the manufacture and use of the invention. Many embodiments of the invention can be made.

What is claimed is:

1. A filter element comprising:
   (a) a media construction comprising a corrugated sheet secured to a flat sheet rolled into a coiled construction; the coiled construction defining a plurality of flutes, a first end, an opposite second end, and an outer annular surface;
      (i) said plurality of flutes comprising inlet flutes and outlet flutes;
         (A) said inlet flutes being open at portions adjacent to said first end and closed at portions adjacent to said second end; and said outlet flutes being closed at portions adjacent to said first end and open at portions adjacent to said second end; and
   (b) a mounting flange secured to said first end of said coiled construction; said mounting flange projecting radially from said outer, annular surface of said coiled construction;
      (i) said mounting flange defining at least one fastener socket to axially mount the filter element into a housing.

2. A filter element according to claim 1 wherein:
   (a) said mounting flange defines first and second opposite axial surfaces; said first axial surface being a sealing surface to receive a bellows for directing gas into said first end of said coiled construction.

3. A filter element according to claim 2 wherein:
   (a) said mounting flange further includes a guiding surface to orient a bellows; said guiding surface comprising an arc having a concave surface extending from said first axial surface to said coiled construction.

4. A filter element according to claim 3 further including:
   (a) a grid construction secured to said coiled construction; said grid construction including a screen oriented over said coiled construction first end;
      (i) said mounting flange and said grid construction are an integral, unitary piece.

5. A filter element according to claim 4 wherein:
   (a) said grid construction includes a band supporting said screen;
      (i) said band circumscribing and being secured to said outer, annular surface of said coiled construction.

6. A filter element according to claim 5 wherein:
   (a) said grid construction further includes an outer wall spaced from and circumscribing said band;
      (i) said outer wall and said band defining a channel therebetween;
      (ii) said outer wall defining a plurality of spaced voids therein.

7. A filter element according to claim 6 wherein:
   (a) said mounting flange extends from said grid construction outer wall.

8. A filter element according to claim 7 further including:
   (a) a ramp construction extending from said arc to said screen.

9. A filter element according to claim 4 wherein:
   (a) said screen includes a plurality of spokes extending from a central hub and a plurality of arched members extending between said spokes.

10. A filter element according to claim 4 further including:
    (a) a seal member oriented adjacent to said second end of said coiled construction;
    and
    (b) a frame having a skirt and an axial extension;
       (i) said skirt circumscribing and securing said frame to said coiled construction;
       (ii) said axial extension having an annular portion;
          (A) said annular portion of said axial extension supporting said seal member.

11. A filter element according to claim 1 further including:
    (a) a grid construction secured to said coiled construction; said grid construction including a screen oriented over said coiled construction first end; a tubular band supporting said screen; and an outer wall spaced from and circumscribing said band;
       (i) said screen including a plurality of spokes extending from a central hub and a plurality of arched members extending between said spokes;
       (ii) said tubular band circumscribing and being secured to said outer, annular surface of said coiled construction;
       (iii) said outer wall and said band defining a housing engagement pocket therebetween; and
       (iv) said outer wall defining a plurality of spaced voids therein.

12. An air cleaner comprising:
    (a) a housing defining an interior volume;
    (b) a filter element operably oriented at least partially in said housing interior volume; said filter element comprising:
       (i) a media construction comprising a corrugated sheet secured to a flat sheet rolled into a coiled construction; the coiled construction defining a plurality of flutes, a first end, an opposite second end, and an outer annular surface;
          (A) said plurality of flutes comprising inlet flutes and outlet flutes; said inlet flutes being open at portions adjacent to said first end and closed at portions adjacent to said second end; and said outlet flutes being closed at portions adjacent to said first end and open at portions adjacent to said second end; and
       (ii) a mounting flange secured to said first end of said coiled construction; said mounting flange projecting radially from said outer, annular surface of said coiled construction;
          (A) said mounting flange defining a plurality of fastener-receiving sockets axially therethrough; and
    (c) a plurality of fasteners extending through said fastener-receiving sockets of said mounting flange to secure said filter element to said housing.

13. An air cleaner according to claim 12 further including:
    (a) a radial seal oriented between said filter element and said housing.

14. An air cleaner according to claim 13 wherein:
(a) said mounting flange defines first and second opposite axial surfaces; said first axial surface being a sealing surface to receive a bellows for directing gas into said first end of said coiled construction; and
(b) said mounting flange further includes a guiding surface to orient the bellows; said guiding surface comprising an arc having a concave surface extending from said first axial surface to said coiled construction.

15. An air cleaner according to claim 14 wherein:
(a) said housing includes a sidewall and plurality of fastener housings mounted on said sidewall;
   (i) said fastener housings receiving said plurality of fasteners to secure said filter element to said housing; and
(b) said filter element further includes a grid construction secured to said coiled construction; said grid construction including a screen oriented over said coiled construction first end; a tubular band supporting said screen; and an outer wall spaced from and circumscribing said band;
   (i) said tubular band circumscribing and being secured to said outer, annular surface of said coiled construction;
   (ii) said outer wall and said band defining a housing engagement pocket therebetween;
      (A) said housing sidewall being oriented within said housing engagement pocket; and
   (iii) said outer wall defining a plurality of spaced voids therein oriented adjacent to said fastener housings.

16. An air cleaner according to claim 14 further comprising:
(a) a bellows oriented over said coiled construction first end; said bellows having an end in engagement with said sealing surface of said mounting flange.

17. A method of installing a filter element in an air cleaner housing; the method comprising:
(a) providing a filter element comprising:
   (i) a media construction comprising a corrugated sheet secured to a flat sheet rolled into a coiled construction; the coiled construction defining a plurality of flutes, a first end, an opposite second end, and an outer annular surface;
      (A) the plurality of flutes comprising inlet flutes and outlet flutes; the inlet flutes being open at portions adjacent to the first end and closed at portions adjacent to the second end; and the outlet flutes being closed at portions adjacent to the first end and open at portions adjacent to the second end;
   (ii) a mounting flange secured to the first end of the coiled construction; the mounting flange projecting radially from the outer, annular surface of the coiled construction and adjacent to the first end of the coiled construction;
(b) orienting the filter element into an interior volume of a housing;
(c) forming a radial seal between the filter element and the housing adjacent to the second end of the coiled construction; and
(d) securing the filter element to the housing by axial engagement between the mounting flange and the housing.

18. A method according to claim 17 wherein:
(a) said step of providing a filter element includes providing a filter element having a grid construction secured to the coiled construction; the grid construction including a screen oriented over the coiled construction first end; a tubular band supporting the screen; and an outer wall spaced from and circumscribing the band;
   (i) the screen including a plurality of spokes extending from a central hub and a plurality of arched members extending between the spokes;
   (ii) the tubular band circumscribing and being secured to the outer, annular surface of the coiled construction;
(b) said step of orienting the filter element into an interior volume of a housing including engaging a sidewall of the housing in a pocket between the outer wall and the band; and
(c) said step of securing the filter element to the housing includes inserting a plurality of bolts through sockets in the mounting flange and into receiving sockets in said housing.

19. A method according to claim 18 further including:
(a) after said step of securing the filter element to the housing, guiding a bellows over the first end of the coiled construction using a contoured surface of the mounting flange.

* * * * *

UNITED STATES PATENT AND TRADEMARK OFFICE
CERTIFICATE OF CORRECTION

PATENT NO. : 6,517,598 B2
DATED : February 11, 2003
INVENTOR(S) : Anderson et al.

It is certified that error appears in the above-identified patent and that said Letters Patent is hereby corrected as shown below:

Column 7,
Line 62, delete "articular" and insert -- particular --.

Column 8,
Line 50, delete "I" and insert -- 1 --.

Signed and Sealed this

Tenth Day of June, 2003

JAMES E. ROGAN
*Director of the United States Patent and Trademark Office*